United States Patent [19]

Heberle et al.

[11] Patent Number: 4,746,786  
[45] Date of Patent: May 24, 1988

[54] METHOD AND APPARATUS FOR EVALUATING UNITS STORED ON CREDIT CARDS

[75] Inventors: Wolfgang Heberle, Wolfratshausen; Max Ludwig, Munich, both of Fed. Rep. of Germany

[73] Assignee: Siemens Aktiengesellschaft, Berlin & Munich, Fed. Rep. of Germany

[21] Appl. No.: 917,969

[22] Filed: Oct. 14, 1986

[30] Foreign Application Priority Data

Nov. 19, 1985 [DE] Fed. Rep. of Germany ....... 3541014

[51] Int. Cl.$^4$ .............................................. G06K 5/00
[52] U.S. Cl. ..................................... 235/380; 235/492; 379/91; 379/144
[58] Field of Search ............... 235/492, 380, 488; 379/91, 132, 144

[56] References Cited

U.S. PATENT DOCUMENTS

| | | | |
|---|---|---|---|
| 3,637,994 | 1/1972 | Ellingboe | 235/488 |
| 4,007,355 | 2/1977 | Moreno | 235/492 X |
| 4,187,498 | 2/1980 | Creekmore | 379/91 X |
| 4,577,061 | 3/1986 | Katzeff et al. | 379/91 |

OTHER PUBLICATIONS

Funkschau; Mar. 1985; "Smart cards im Vormarsch: Elektronisches Geld"; pp. 39–41.

Primary Examiner—David L. Trafton  
Attorney, Agent, or Firm—Hill, Van Santen, Steadman & Simpson

[57] ABSTRACT

A method for the evaluation of used fee units of a card owner and of a central evaluation location (uP) stored on credit cards (KK) for automatic vendors.

In the present invention an evaluation method which prevents manipulations at the credit card is used.

This results in that the used fee units are stored in at least one counter (RZ1, RZ2) arranged on the credit card (KK) whose current reading is called in by the central evaluation location (uP) at intervals unknown to the card owner, particularly at randomly oriented intervals, and, subsequently is compared in the evaluation location (uP) to the most recently called-in counter reading. The account of the card owner is charged with the difference between the old and the new fee units.

2 Claims, 1 Drawing Sheet

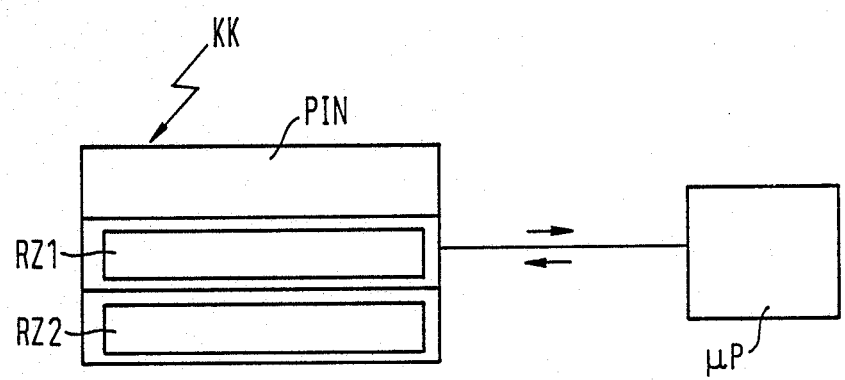

METHOD AND APPARATUS FOR EVALUATING UNITS STORED ON CREDIT CARDS

BACKGROUND OF THE INVENTION

1. Field of the Invention

The invention relates in general to a method for evaluating the number of used fee units of a card owner which are stored on credit cards for automatic vendors and of a central evaluation location particularly for telecommuication equipment connected to a switching center such that the credit cards are provided with personal identification features such as a personal identification number.

2. Description of the Prior Art

A credit card is known for frequent callers in telecommunication technology wherein calls may be made from public telephone booths and can be charged to the home telephone number. The accounting procedure therefore sequences in the following manner. The public card telephones are connected to an accumulator (concentrator) to which the card sends a number of a subscriber as well as the number of fee units which have already been used by telephoning with the particular card. This does not occur after every telephone call because individual accounting entries would be too expensive. Only when the number of units used are in the range of 40 through 50 does the card automatically emit the unit number to the accumulator or concentrator. For 40 components of telephone fees, thus only one component gives rise to accounting fees.

This manner of accounting however, has the disadvantage in that credit cards can be manipulated or changed because if the card owner understands the system, he can simulate a debiting to the central evaluation location which has not yet been carried out by performing operations on the credit card.

SUMMARY OF THE INVENTION

It is therefore an object of the present invention to disclose an evaluation method by means of which manipulations at the card are impossible.

This object is achieved in that the used fee units are stored in at least one counter arranged on the credit card and the current reading of the one counter is called in by a central evaluation location at intervals unknown to the card owner; particularly at randomly oriented intervals and subsequently is compared in the evaluation location to the most recently called in counter reading whereby the account of the card owner is charged with the difference between the old and new fee units.

In contrast to the debiting method of the prior art set forth above wherein the card supplies the reading to the central evaluation location upon a defined counter reading of the card, the interrogation of the count reading in the method of the invention occurs from the side of the central evaluation location in irregular randomly controlled intervals. The momentarily identified counter reading is thereby respectively compared to the previously identified counter reading and the charge account of the account owner is charged with the difference.

In addition, for example, to the identification features a corresponding credit card for the implementation of the method can comprise a first counter to which a second overflow counter is connected. The counters can then be connected in the manner of a roll over counter such that after a defined plurality of units has been reached on the first counter this is cancelled and one unit is then transferred onto the second counter.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

The FIG. schematically illustrates a credit card which is connected to a microprocessor.

DESCRIPTION OF THE PREFERRED EMBODIMENTS

The drawing shows credit card KK upon which the personal data of the credit card owner is stored in an upper portion thereof. These personal data PIN corresponds to personal identification number and serve for the identification of the credit card owner and can, for example, comprise a multidigit number whereby the card owner must input a code which only he knows every time a new input of the card is made into a corresponding receiving apparatus, as for example, the microprocessor illustrated. First counter RZ1 and a second counter RZ2 connected to the first counter are also located on the credit card KK. The first counter RZ1 can, for example, have a capacitor of 200 fee units whereas the second counter RZ2 may comprise a multiple of 200 fee units. In other words, only one used unit is registered on the second counter RZ2 after 200 fee units have been used on the first counter RZ1. When the transfer of the one unit representing 200 fee units is made to the second counter RZ2, the first counter RZ1 is reset.

The method of the invention for the evaluation of units is comprised such that a microprocessor uP calls in the counter readings of the counters RZ1 and RZ2 which have been totalled up on the credit card at irregular randomly oriented intervals when the card is placed into a reading microprocessor. By comparing the current count reading to the previously identified count reading, the difference is identified and the account of the card owner can be charged this amount. Since the method totals up the credit card at irregular randomly oriented intervals, the owner cannot modify the readings on the counters so as to cause inaccurate billing to be made. The owner is not aware of when the microprocessor calls in the counter readings of the counters RZ1 and RZ2 since this is done at randomly oriented intervals.

Although the invention has been described with respect to preferred embodiments, it is not to be so limited as changes and modifications can be made which are within the full intended scope of the invention as defined by the appended claims.

We claim as our invention

1. A method for the evaluation of used fee units of a card owner and of a central evaluation location which are stored on credit cards for automatic vendors, particularly for telecommunications equipment connected to a switching center, whereby the credit card is provided with personal identification features, comprising the steps of storing used fee units in at least one counter (RZ1, RZ2) arranged on the credit card, calling in the current reading thereof by the central evaluation location (uP) at intervals unknown to the card owner, particularly, at randomly oriented intervals and comparing in the evaluation location the current reading with the most recently called-in counter reading, and charging the account of the card owner with the difference between the old and the new fee units.

2. A credit card for the implementation of the method according to claim 1, characterized in that, in addition to the identification features of the card owner arranged on the credit card, a first counter (RZ1) is also arranged thereon, and a second overflow counter (RZ2) arranged on the card and coupled to said first counter.

* * * * *